United States Patent [19]

Menard

[11] 4,395,696
[45] * Jul. 26, 1983

[54] PLASTIC EMERGENCY POWER PACK FOR VEHICLE TRAILER

[76] Inventor: Roger O. Menard, P.O. Box 1216, Clearfield, Pa. 16830

[ * ] Notice: The portion of the term of this patent subsequent to Feb. 27, 1996, has been disclaimed.

[21] Appl. No.: 124,741

[22] Filed: Feb. 26, 1980

[51] Int. Cl.³ ............................ B60Q 1/00; B60Q 1/46
[52] U.S. Cl. ..................................... 340/74; 340/81 R; 340/90; 307/64; 307/150; 307/10 LS; 429/89; 429/97; 429/179; 362/183; 362/109
[58] Field of Search ............ 340/81 R, 81 F, 90, 340/84, 87, 114 R, 114 B, 333, 74, 514; 429/96–100, 164, 90, 89, 179; 362/109, 157, 183, 189, 190, 191; 307/64, 150, 10 LS

[56] References Cited

U.S. PATENT DOCUMENTS

| | | | |
|---|---|---|---|
| 2,096,627 | 10/1937 | Deibel | 429/89 |
| 2,396,534 | 3/1946 | Rose | 429/89 |
| 2,987,718 | 6/1961 | Davis | 340/81 R |
| 3,110,507 | 11/1963 | Riner | 429/97 |
| 3,963,972 | 6/1976 | Todd | 429/97 |
| 4,142,172 | 2/1979 | Menard | 340/81 R |
| 4,160,857 | 7/1979 | Nardella et al. | 429/99 |

*Primary Examiner*—Donnie Lee Crosland
*Attorney, Agent, or Firm*—Saidman, Sterne & Kessler

[57] ABSTRACT

A portable, lightweight and inexpensive emergency power pack to be hooked up to the lighting system of a vehicle trailer, such as a semi-trailer, camper, mobile home or the like, for the purpose of flashing all or some trailer lights on and off while the trailer is unhitched on the side of a road so as to warn passing motorists of its presence. The device includes a battery, an on-off switch, a flasher and an illuminating light. The case for supporting the battery and other components is made of a unitary, molded plastic piece, and includes a cylindrical housing on one side thereof that contains an adapter plug for connecting to a mating plug in the vehicle trailer. Auxiliary warning lights may also be strung from a special connector on the unit, while an alternate embodiment may be utilized in the shop to test the various electrical systems on the trailers.

21 Claims, 8 Drawing Figures

PLASTIC EMERGENCY POWER PACK FOR VEHICLE TRAILER

BACKGROUND OF THE INVENTION

1. Field Of The Invention

The present invention is related to emergency power packs and, more particularly, is directed towards a portable battery and associated circuitry adapted to be used in connection with unattended or detached trailers for flashing or testing the lights thereof so as to warn oncoming motorists of a potential hazard.

2. Description Of The State Of The Art

In my earlier U.S. Pat. No. 4,142,172, which issued on Feb. 27, 1979, I teach a device which is provided with its own power supply to be hooked up to the lighting system of a vehicle trailer for the purpose of flashing all or some of the trailer lights on and off while the trailer might be left unattended at the side of a road so as to warn passing motorists of its presence. The emergency power pack therein described included a dry cell battery, a conventional flasher mechanism, an on-off switch, a mounting plate having a handle integrally provided therewith and an adapter plug designed to mate with a socket on the vehicle's trailer.

My earlier invention, as set forth in my patent, solved the problem of providing a portable, self-contained unit that could be readily transported and plugged into the trailer's lighting system to flash some or all of the lights on the trailer as a warning to motorists, in order to prevent potentially crippling or fatal accidents.

Since the development of my original invention, as set forth in the above-noted patent, I have endeavored to make improvements thereto which would lead to greater acceptance in the marketplace, provide a more compact yet sturdy unit, would be inexpensive to manufacture, and which would be more amenable to mass production. Additionally, I have discoverd that several features can be added to the basic unit, with minimal additional cost, in order to provide an even greater level of safety than heretofore achievable. For example, should one or more of the trailer's lights fail, auxiliary lights should be provided which can be connected into the emergency power pack.

It is towards providing the above-stated improvements in design that the present invention is advanced.

Prior art U.S. Patents of which I am aware include: Nos. 3,063,046; 3,340,503; 3,560,923; 3,694,729; 3,963,972; and 4,017,827.

OBJECTS AND SUMMARY OF THE INVENTION

It therefore a primary object of the present invention to provide an improved emergency power pack for vehicle trailer lights which improves upon the design of my earlier device, and solves many of the deficiencies noted above.

Another object of the present invention is to provide an emergency power pack for vehicle trailer lights which is lightweight, portable, inexpensive, readily mass-producible, and is more compact than the prior art units.

Another object of the present invention is to provide an emergency power pack for vehicle trailer lights which is equipped to operate auxiliary lighting in the event that the trailer's main lights are inoperative.

A still further object of the present invention is to provide an extremely inexpensive, unitary, molded plastic case for supporting the auxiliary power supply and associated components in such a manner so that a lightweight, compact, inexpensive and attractive unit results.

An additional object of the present invention is to provide a plastic emergency power pack for vehicle trailer lights which may be readily manufactured using known techniques and existing components, and which, when properly used, has the potential for avoiding major highway accidents caused by improperly illuminated emergency conditions on the road.

The foregoing and other objects are attained in accordance with one aspect of the present invention through the provision of an emergency power pack adapted to be connected to an unhitched trailer of a tractor-trailer of the type which has a plug on the tractor and a mating socket on the trailer to provide an electrical connection therebetween when hitched for controlling the lights on the trailer from a first source of power on the tractor. The power pack comprises a second source of power comprising a battery, a unitary plastic case for supporting the battery and having a handle extending integrally therefrom, an adapter plug adapted to mate with the socket on the trailer, flasher means electrically connected to the adapter plug and the battery for flashing the lights on the trailer when the adapter plug is mated with the socket when the trailer is unhitched from the tractor, and means formed integrally on the case for housing the adapter plug.

In accordance with more detailed aspects of the present invention, means may be formed integrally on the case for supporting the flasher means, and switch means may be mounted on the case which are electrically connected to the battery and the adapter plug for controlling the power therefrom. An illuminating light may also be mounted on the handle of the case, and connector means may also be mounted on the case and connected in circuit with the flasher means and the battery for receiving supplementary flashing light means. The latter may preferably comprise a string of lights coupled to a common connector for mating with the connector means, the string adapted to be placed on the side of the trailer to provide an auxiliary flashing warning in an emergency.

In accordance with other more specific aspects of the present invention, the unitary plastic case is substantially C-shaped in vertical section for receiving the battery thereinwithin, the case including a top wall, a substantially parallel bottom wall and a front wall connecting the top and bottom walls. The means for housing the adapter plug preferably extends integrally from the front wall of the case, while the handle extends integrally rearwardly and downwardly from the top wall of the case, so as to be substantially parallel with the front wall. The top wall preferably includes aperture means therein for receiving the terminals of the battery, and further comprises means attachable to the terminals through the aperture means for securing the battery to the case. The top wall may also include means formed therein for receiving the flasher means.

The top and bottom walls of the case may each include a lip for gripping a top and bottom edge, respectively, of the battery, and the case may also have means formed therein for permitting the walls thereof to flex away from one another to facilitate installation of the battery. The wall flexing means may, in a particular embodiment, comprise a recess formed at the junction of the front wall and one of the bottom or top walls.

In accordance with another aspect of the present invention, the latter may be utilized as a test device for the plurality of terminals in the adapter plug. In such an embodiment, the top wall includes a plurality of switch means mounted thereon, each connected to one of the plurality of terminals in the adapter plug for permitting testing thereof as well as the lights of the trailer when the trailer is unhitched from the tractor as may occur, for example, in the trailer terminal or shop.

In accordance with yet another aspect of the present invention, apparatus is provided which comprises means for supporting a battery that includes in integral plastic case having a top wall, a bottom wall, and a front wall connecting the top and bottom wall, a handle extending integrally rearwardly and downwardly from the top wall, and means for housing an adapter plug extending integrally from the front wall. The latter may preferably include a substantially cylindrical housing extending substantially perpendicularly from the front wall.

BRIEF DESCRIPTION OF THE DRAWINGS

Various objects, features and attendant advantages of the present invention will be more fully appreciated as the same become better understood from the following detailed description of the present invention when considered in connection with the accompanying drawings, in which.

DETAILED DESCRIPTION OF THE PREFERRED EMBODIMENTS

Figure 3:
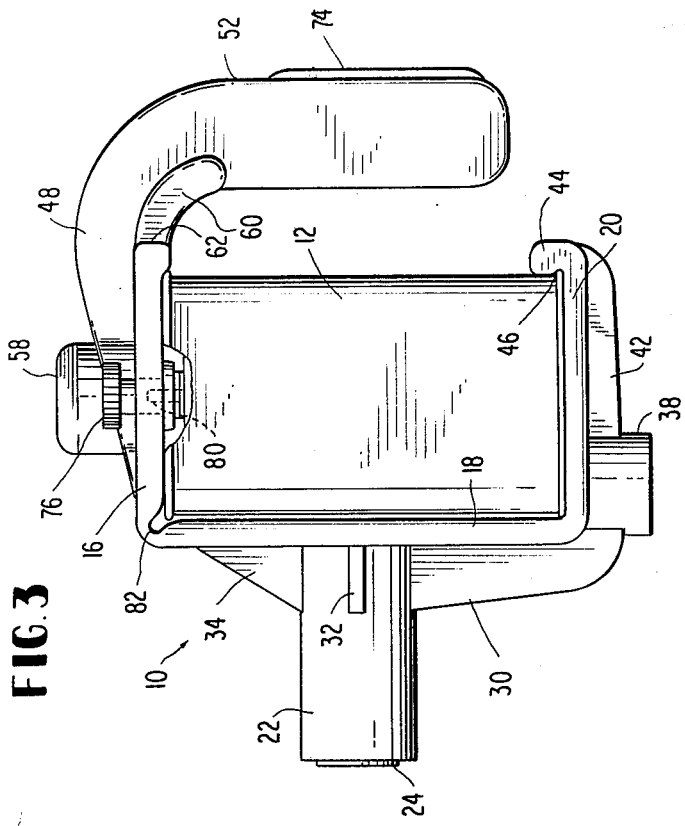
FIG. 3 is a side view of the preferred embodiment illustrated in FIG. 2.
Figure 2:
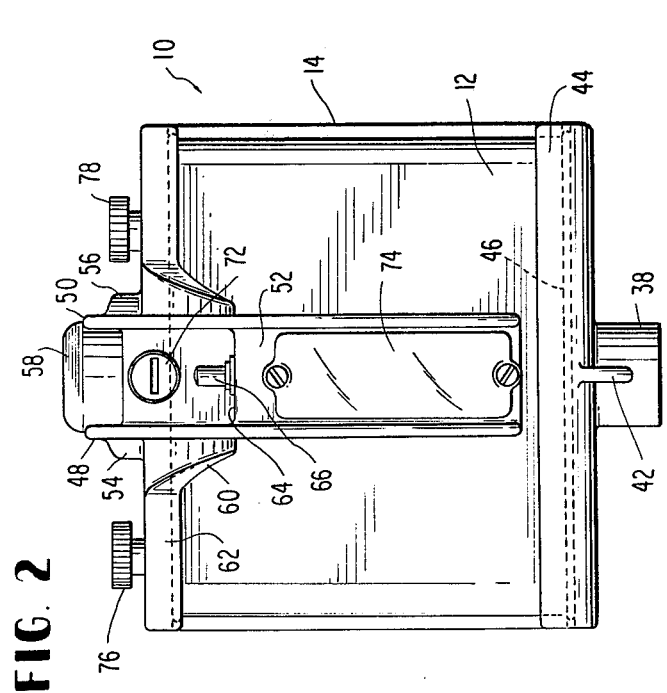
FIG. 2 is a rear view in elevation of a preferred embodiment of the present invention.

Referring now to the drawings, wherein like reference numerals represent identical or corresponding parts throughout the several views, attention is directed to FIGS. 2 and 3 which illustrate rear and side views of a preferred embodiment of the emergency power pack of the present invention which is indicated generally by reference numeral 10.

The power pack 10 of the present invention includes a dry-cell battery 12 which may preferably comprise a heavy duty twelve volt battery, such as No. 926 manufactured by Ray-O-Vac ®. Such a battery is long-lasting, compact (measuring 5"×2¼"×4") and sturdy. Obviously, however, other batteries may be equally suited with the present invention.

The housing or case for the battery 12 and associated components is indicated by reference numeral 14 in FIG. 2 and preferably comprises a unitary body formed of a sturdy, lightweight, and somewhat resilient plastic.

The color of the case may be varied, or may be made of a suitable lightreflecting color, such as orange or yellow, to provide an additional safety feature for the present invention. Additionally or alternatively, the plastic may be impregnated with highly light-reflective or fluorescent particles.

In a preferred form, as illustrated in the drawings, the housing or case 14 comprises a substantially C-shaped structure in vertical section (see FIG. 3) which is open on both sides as well as on the rear thereof. More particularly, case 14 includes a top wall 16, a substantially parallel bottom wall 20, and a vertical front wall 18 which connects the top and bottom walls 16 and 20, respectively. As may be appreciated from FIGS. 2 and 3, the battery 12 is adapted to fit within the top, front and bottom walls of the case 14, and is inserted and secured thereto in a manner which will be described in greater detail hereinafter.

Figure 6:
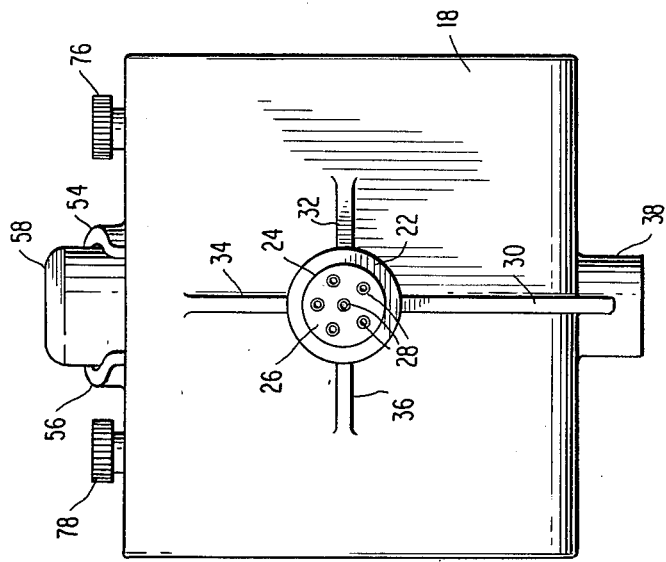
FIG. 6 is a front view of the preferred embodiment illustrated in FIG. 3.

Referring now to FIGS. 3 and 6, the front wall 18 of the plastic case 14 of the present invention is seen to include an integrally formed substantially cylindrical support or housing 22 within which is mounted an adapter plug 24. Adapter plug 24 is of the type which is normally mounted on or extends from a cable on the tractor for mating with a complimentary socket mounted on the trailer to complete an electrical circuit from a power supply on the tractor to energize the lights on the trailer. Plug 24 includes a hardened plastic plug housing 26 having a plurality of connectors 28 which are adapted to mate with correspondingly sized and positioned prongs emanating from the socket on the trailer (not shown). One of the connectors 28 is normally a grounding connector, while the remaining connectors operate the stop lights, turn lights, back-up lights, clearance lights and four-way flashers. Plug 24 is held within cylindrical support member 22 by any conventional means. The thickness of cylindrical support 22 is sufficiently thin to enable the entire plug to be inserted within the socket, and the outer periphery of the cylindrical support 22 may be provided with an elongated rib (not shown) to mate with a corresponding recess in the socket (not shown) to insure that the connectors and terminals are properly oriented. As may be appreciated from FIG. 6, a plurality of flanges 30, 32, 34 and 36 may be integrally formed between front wall 18 and cylindrical support 22 for providing reinforcement to the latter at its connection to the former. Other suitable reinforcing means are within the scope of the present invention.

Figure 1:
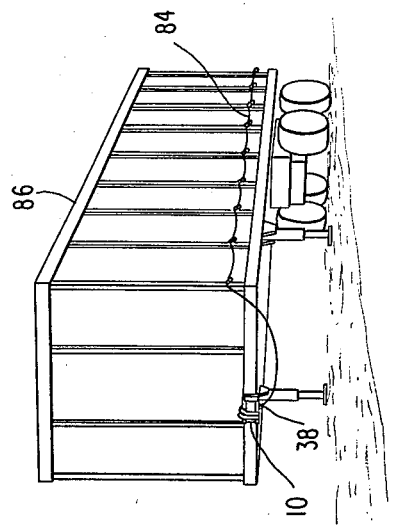
FIG. 1 is a perspective view of an unhitched trailer having the device of the present invention attached thereto along with an additional feature thereof.
Figure 4:
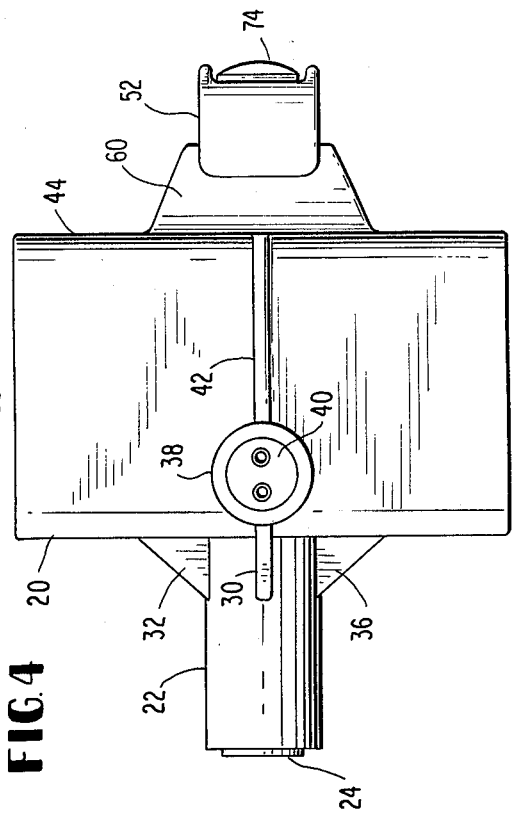
FIG. 4 is a bottom view of the preferred embodiment illustrated in FIG. 3.

Referring also to FIG. 4, the bottom wall 20 of the case 14 includes another integrally formed connector housing 38 having a plug 40 positioned therein. Plug 40 is provided for the purpose of permitting connection of an auxiliary light source to the power pack 10. Such an auxiliary light source may, for example, take the form of a string of lights 84 (See FIG. 1) which may be mounted on the side of trailer 86 and which have a common connector for mating with the plug 40. Clearly, lights 84 could be mounted in any other suitable location, such as on the ground, within the scope of the present invention. Light string 84 may be desirable either in addition or as an alternative to flashing the stop lights of the trailer 86 to warn oncoming motorists. Such a string of lights 84 would be invaluable, for example, should one or more of the regular stop lights of the trailer be inoperative. FIG. 1 also illustrates the proper installation of the power pack 10 of the present invention when mated with the socket located on the front lower portion of the trailer 86.

Referring back to FIG. 4, the additional connector housing 38 may also be provided with a reinforcing flange 42, which serves a similar function to that of flange 30. Along the rear edge of the bottom wall 20 is integrally formed a bottom lip 44 that extends upwardly and is adapted to grip the bottom rear edge 46 of the battery 12 to more securely encase the latter, while still utilizing the minimum amount of plastic material.

Figure 5:
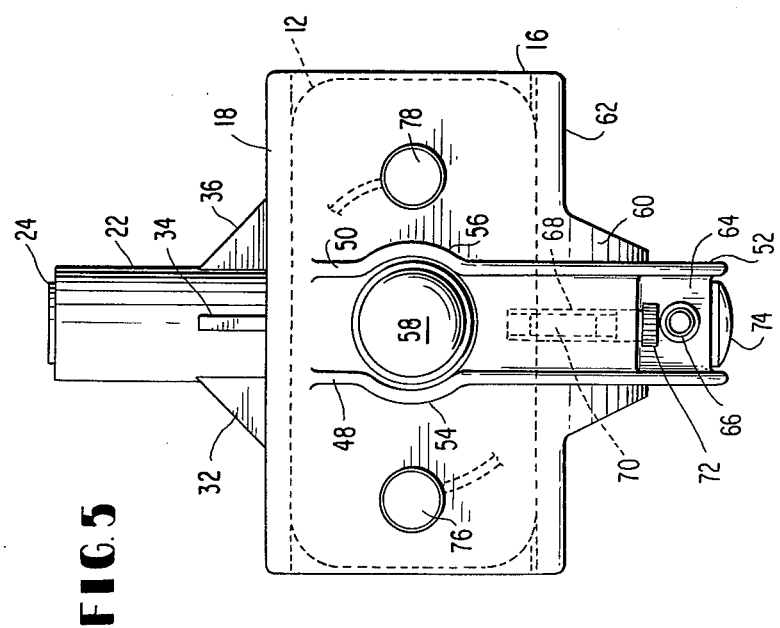
FIG. 5 is a top view of the preferred embodiment illustrated in FIG. 2.

Referring now also to FIG. 5, the top wall 16 of the case 14 includes a pair of complimentary upstanding flanges 48 and 50 that extend rearwardly and downwardly at the back part of the case 14 to form a handle 52 (see FIGS. 2 and 3). Flanges 48 and 50 are preferably provided with opposed, complimentary curved portions 54 and 56 for receiving a flasher unit 58 therewithin. The flasher 58 may be comprised of a readily available flashing unit, such as that disclosed in U.S. Pat. No. 3,218,415 or may alternatively consist of a solid state flasher, or any equivalent mechanism.

Extending from the rear edge 62 of top wall 16 is a reinforcing curved flange 60 which underlies the flanges 48 and 50 and provides additional support for the handle 52 at the point where it extends from the top wall 16. Other suitable reinforcing means may be suggested, and are within the purview of one of ordinary skill in the art.

Referring again to FIGS. 2 and 5, the flanges 48 and 50 that form the handle 52 preferably include a hollowed out central portion (not shown) having an upper ledge 64 from which extends an on-off push switch 66 which serves to activate the power pack in a manner to be described in greater detail hereinafter. A recess 68 is also preferably formed in flange 60 and top wall 16 for receiving a fuse 70 that may be held in place by a cap 72.

On the vertical rear wall of handle 52 is preferably mounted a work light 74 for illuminating a small working area. Alternatively, light 74 could be in the form of a flashing light, or a combination of a work light and flashing light. Still alternatively, light 74 could be replaced by a passive highway reflector.

Battery 12 is held in place in case 14 by means of a pair of plastic terminals posts 76 and 78 that extend through similarly sized apertures in the top wall 16 of case 14. The posts 76 and 78 are internally threaded for securing same to the threaded terminals (e.g., terminal 80 of FIG. 3) of battery 12.

To facilitate the installation and removal of battery 12 in case 14, the junction of the top wall 16 and front wall 18 has a lengthwise extending recess 82 (FIG. 3). This recess, which also or alternatively may be formed at the junction of bottom wall 20 and front wall 18, permits the two adjacent walls to be flexed away from one another more easily than would otherwise be possible, thereby enabling battery 12 to be more easily slipped into place during assembly or replacement.

Although the wiring of the various components illustrated in FIGS. 2–6 of the drawings is not illustrated in detail in those figures, it should be appreciated that discrete wiring may extend internally of the casing 14 so as to prevent exposure of the wiring to the outer elements. Further, the wiring, if desired, may take the form of printed circuitry on the inside surface of the plastic housing 14. Such printed circuitry would obviate the need of discrete wiring.

Figure 7:
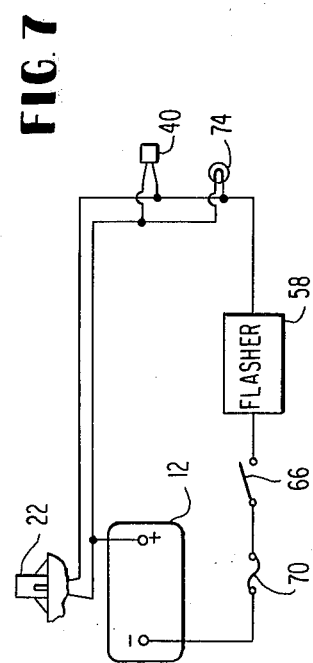
FIG. 7 is a schematic circuit diagram illustrating the wiring of the preferred embodiment of FIGS. 2–6.

Referring now to FIG. 7, there is illustrated a schematic circuit diagram of the preferred embodiment of FIGS. 2–6 wherein like reference numerals are similarly labeled. As may be appreciated, two of the six terminals in adapter plug 26 are utilized for this particular embodiment, one of the terminals being the ground connection, the other terminal being that connected to the stop lights of the trailer 86. In circuit with the battery 12 is the flasher unit 58, on-off switch 66, fuse 70, illuminating light 74 as well as the plug 40 for connecting the string of lights 84 (see FIG. 1).

Figure 8:
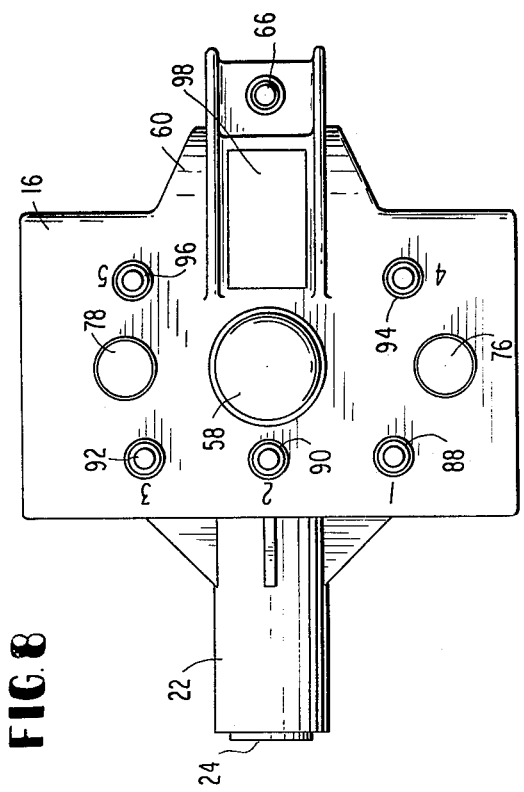
FIG. 8 is a top view of a modified form of the present invention utilized as a testing unit.

Referring now to FIG. 8, there is illustrated an alternate embodiment of the present invention which is particularly designed to be used as a test device for use when the trailers are in the shop for checking the trailer's electrical circuits and lights. In this modified form of the invention, the top wall 16 may be provided with five test switches 88, 90, 92, 94 and 96, each of which is connected in circuit with the battery and one of the terminals in plug 24. This permits testing of the stop lights, turn lights, back-up lights, clearance lights and four-way flashers. A circuit breaker 98 may be needed to prevent overloads with the clearance and back-up lights, while the flasher 58 would be used in circuit with the four-way flashers, stop and turn lights. This unit provides the fleet operator with a quick and easy way of testing the trailer's lighting system, without requiring that each trailer be hitched to a tractor before so doing. In this manner, repairs may be made in the shop before the trailer must go on the road.

Obviously, numerous modifications and variations of the present invention are possible in light of the above teachings. It is therefore to be understood that, within the scope of the appended claims, the invention may be practiced otherwise than as specifically described herein.

I claim as my invention:

1. An emergency power pack adapted to be connected to an unhitched trailer of a tractor-trailer of the type which has a plug on said tractor and a mating socket on said trailer to provide an electrical connection therebetween when hitched for controlling the lights on said trailer from a first source of power on said tractor, which comprises:
   a second source of power comprising a battery;
   a plastic case for supporting said battery;
   an adapter plug adapted to mate with said socket;
   flasher means electrically connected to said adapter plug and said battery for flashing the lights on said trailer when said adapter plug is mated with said socket when said trailer is unhitched from said tractor; and
   means formed integrally on said case for housing said adapter plug.

2. The emergency power pack as set forth in claim 1, further comprising means formed integrally on said case for supporting said flasher means.

3. The emergency power pack as set forth in claim 1, further comprising switch means mounted on said case and electrically connected to said battery and said adapter plug for controlling the power therefrom.

4. The emergency power pack as set forth in claim 1, further comprising an illuminating light mounted on said case.

5. The emergency power pack as set forth in claim 4, wherein said case includes a handle extending integrally therefrom and wherein said light is mounted on said handle.

6. The emergency power pack as set forth in claim 1, further comprising connector means mounted on said case and connected in circuit with said flasher means and said battery and adapted to receive supplementary flashing light means.

7. The emergency power pack as set forth in claim 6, wherein said supplementary flashing light means comprises a string of lights coupled to a common connector for mating with said connector means, said string adapted to be placed on the side of said trailer to provide an auxiliary flashing warning in an emergency.

8. The emergency power pack as set forth in claim 1, wherein said plastic case is unitary and substantially C-shaped in vertical section for receiving said battery therewithin.

9. The emergency power pack as set forth in claim 8, wherein said case includes a handle, a top wall, a substantially parallel bottom wall and a front wall connecting said top and bottom walls.

10. The emergency power pack as set forth in claim 9, wherein said means for housing said adapter plug extends integrally from said front wall of said case.

11. The emergency power pack as set forth in claim 9, wherein said handle extends integrally rearwardly and downwardly from said top wall of said case so as to be substantially parallel with said front wall.

12. The emergency power pack as set forth in claim 11, wherein said handle includes:
switch means mounted thereon which is electrically connected to said battery and said adapter plug for controlling the power therefrom; and
an illuminating light mounted on the exposed rear surface thereof.

13. The emergency power pack as set forth in claim 9, wherein said top wall includes aperture means formed therein for receiving the terminals of said battery, and further comprising means attachable to said terminals through said aperture means for securing said battery to said case.

14. The emergency power pack as set forth in claim 9, wherein said top wall of said case further includes means formed therein for receiving said flasher means.

15. The emergency power pack as set forth in claim 9, wherein said bottom wall includes a lip for gripping a bottom edge of said battery.

16. The emergency power pack as set forth in claim 9, wherein said top wall includes a lip for gripping a top edge of said battery.

17. The emergency power pack as set forth in claim 9, wherein said case includes means formed therein for permitting said walls to flex away from one another to facilitate installation of said battery.

18. The emergency power pack as set forth in claim 17, wherein said wall flexing means comprises a recess formed at the junction of said front wall and one of said bottom or top walls.

19. The emergency power pack as set forth in claim 9, wherein said bottom wall includes connector means mounted on said case and connected in circuit with said flasher means and said battery and adapted to receive supplementary flashing light means.

20. The emergency power pack as set forth in claim 19, wherein said supplementary flashing light means comprises a string of lights coupled to a common connector for mating with said connector means, said string adapted to be placed on the side of said trailer to provide an auxiliary flashing warning in an emergency.

21. The emergency power pack as set forth in claim 9, wherein said adapter plug includes a plurality of terminals and said top wall includes a plurality of switch means mounted thereon, each connected to one of said plurality of terminals for permitting testing thereof when said trailer is unhitched from said tractor.

* * * * *